United States Patent [19]
Oltman

[11] Patent Number: 5,123,256
[45] Date of Patent: Jun. 23, 1992

[54] METHOD OF COMPRESSOR STAGING FOR A MULTI-COMPRESSOR REFRIGERATION SYSTEM

[75] Inventor: Robert L. Oltman, Stoddard, Wis.

[73] Assignee: American Standard Inc., New York, N.Y.

[21] Appl. No.: 696,896

[22] Filed: May 7, 1991

[51] Int. Cl.$^5$ ............................................. F25B 7/00
[52] U.S. Cl. ...................................... 62/175; 307/39; 417/8
[58] Field of Search .................... 62/175, 228, 5; 236/1 EA; 417/5, 8; 307/39

[56] References Cited

U.S. PATENT DOCUMENTS 4,114,807  9/1978  Naseck et al. ............... 236/1 EA
4,679,404  7/1987  Alsenz ................................. 62/175

FOREIGN PATENT DOCUMENTS 0076702  6/1977  Japan .................................. 417/5
0037944  3/1979  Japan ................................ 62/175

*Primary Examiner*—William E. Wayner
*Attorney, Agent, or Firm*—William J. Beres; William O'Driscoll; Peter D. Ferguson

[57] ABSTRACT

A method of staging a plurality of compressors in a refrigeration system. The method comprises the steps of: accumulating a first operative condition for each compressor; accumulating a second operative condition for each compressor; initiating operation of whichever compressor has the lowest accumulation of the first operative condition whenever a system controller calls for an increase in system capacity; and terminating operation of whichever compressor has the greatest accumulation of the second operative condition whenever the system controller calls for a reduction in system capacity.

6 Claims, 2 Drawing Sheets

| COMPRESSOR | FIRST OPERATIVE CONDITION | SECOND OPERATIVE CONDITION | STATUS |
|---|---|---|---|
| $C_1$ | ACCUMULATIVE STARTS 64 | ACCUMULATIVE RUN-TIME 60 | ON/OFF/DISABLED 62 |
| $C_2$ | ACCUMULATIVE STARTS 64 | ACCUMULATIVE RUN-TIME 60 | ON/OFF/DISABLED 62 |
|  |  |  |  |
|  |  |  |  |
| $C_N$ | ACCUMULATIVE STARTS 64 | ACCUMULATIVE RUN-TIME 60 | ON OFF DISABLED 62 |

METHOD OF COMPRESSOR STAGING FOR A MULTI-COMPRESSOR REFRIGERATION SYSTEM

BACKGROUND OF THE INVENTION

The present invention is directed to staging compressors in a multi-compressor refrigeration system, and more particularly, to a method of balancing run time between the multiplicity of compressors while minimizing the number of compressor starts.

In the past compressor staging has been based on continuous compressor run time. The compressor with the longest continuous on time is turned off whenever the refrigeration system calls for a decrease in capacity, and the compressor with the greatest amount of run time is turned on whenever the refrigeration system calls for an increase in capacity. U.S. Pat. Nos. 4,612,776; 4,679,404 and 4,580,947 are examples of this type of control system. This type of control system is intended to balance run time between operable compressors, thereby equalizing wear.

However, one of the largest causes of compressor failure is related to the stress undergone by the compressor during start up. It would be therefore advantageous to minimize the number of starts.

U.S. Pat. No. 4,535,602 alternately selects between equal capacity compressors to even the wear between them. This patent uses predetermined logic tables to determine when to "cut-in" or "cut-out" a compressor. Such an approach cannot compensate for periods of high capacity requirements where a single compressor is cycled on and off while the remaining compressors remain on. Nor can such a system compensate for compressor down time, where the available compressors must be turned on to maintain system refrigeration goals. Additionally, run-time is not equalized by such an approach.

BRIEF SUMMARY OF THE INVENTION

It is an object, feature and advantage of the present invention to solve the problems which occur in the staging of prior art compressors.

It is an object, feature and advantage of the present invention to balance run time in a refrigeration system having a plurality of compressors.

It is an object, feature and advantage of the present invention to minimize the number of compressor starts for each compressor in a multiple compressor system.

It is an object, feature and advantage of the present invention to balance the number of compressor starts for each compressor in a multiple compressor system.

The present invention provides a method of staging a plurality of compressors in a refrigeration system. The method comprises the steps of: accumulating a first operative condition for each compressor; accumulating a second operative condition for each compressor; initiating operation of whichever compressor has the lowest accumulation of the first operative condition whenever a system controller calls for an increase in system capacity; and terminating operation of whichever compressor has the greatest accumulation of the second operative condition whenever the system controller calls for a reduction in system capacity.

The present invention provides a method of staging a plurality of compressors in a refrigeration system. The method comprises the steps of: accumulating the number of starts for each compressor; accumulating the run time for each compressor; initiating operation of whichever compressor has the lowest accumulation of starts whenever a system controller calls for an increase in system capacity; and terminating operation of whichever compressor has the greatest accumulation of run time whenever the system controller calls for a reduction in system capacity.

The present invention also provides a refrigeration system comprising: a plurality of compressors and a system controller operatively connected to each of the plurality of compressors. The controller includes: means for accumulating a first operative condition for each compressor; means for accumulating a second operative condition for each compressor; means for initiating operation of whichever compressor has the lowest accumulation of the first operative condition whenever the system controller calls for an increase in system capacity; and means for terminating operation of whichever compressor has the greatest accumulation of the second operative condition whenever the system controller calls for a reduction in system capacity.

DETAILED DESCRIPTION OF THE INVENTION

Figure 1:
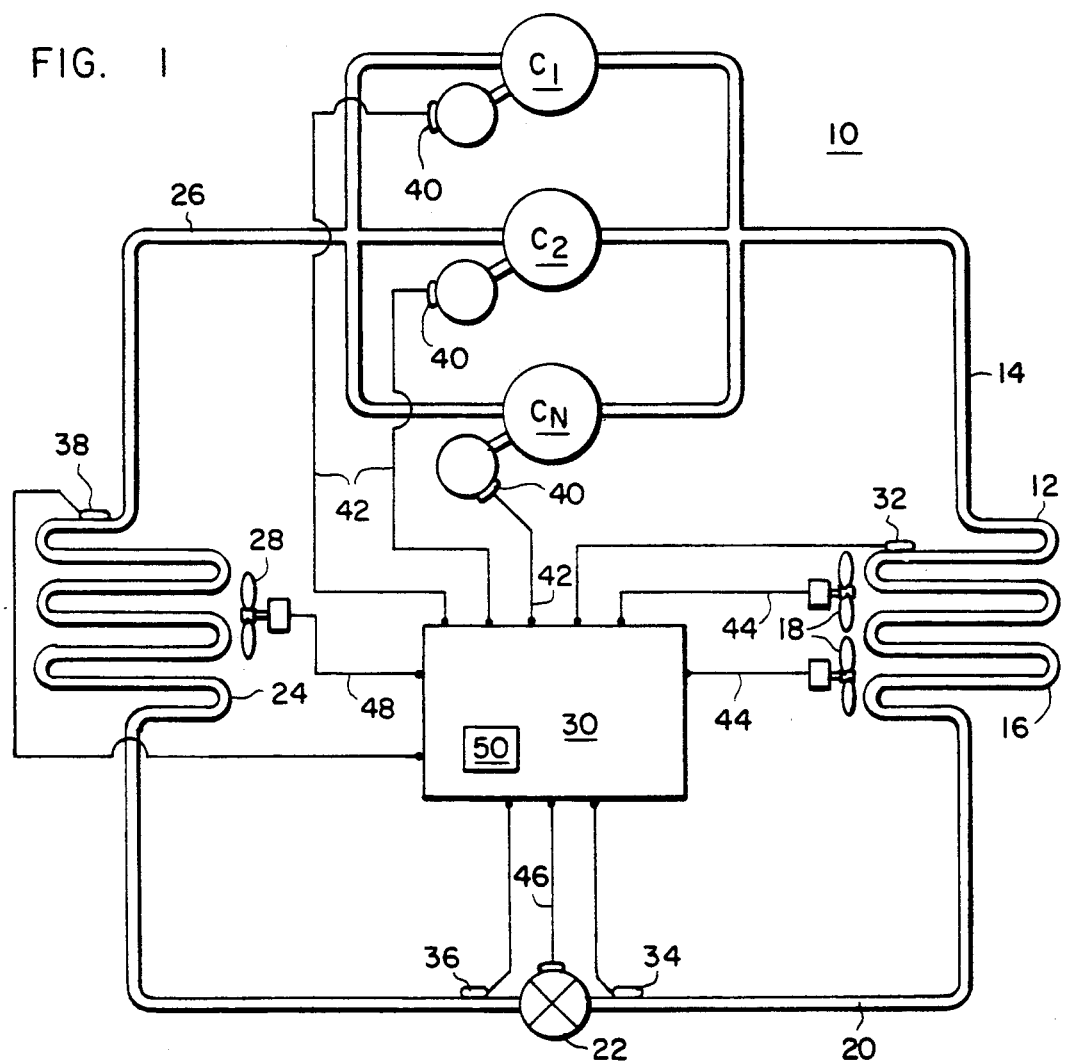
FIG. 1 is a representation of a refrigeration system to which the present invention applies.

FIG. 1 shows a representative refrigeration system 10 to which the present invention can be applied. The system 10 includes a plurality of compressors C1, C2, . . . , Cn which compress vaporized refrigerant and direct the compressed refrigerant toward a condenser 12 by means of conduit 14. In the condenser 12, heat is transferred from the compressed refrigerant through the walls of the condenser tubing 16 to a cooling fluid such as air. Condenser fans 18 produce air flow to enhance the heat exchange between the compressed refrigerant and the cooling fluid. Condensed liquid refrigerant leaves the condenser 12 by means of conduit 20, passes through an expansion valve 22 and enters an evaporator 24 where the liquid refrigerant vaporizes in the process of absorbing heat from a medium to be cooled. The medium could be water, air, brine solutions or the like. The vaporized refrigerant is returned to the compressors by a conduit 26. If the medium to be cooled in the evaporator 24 is air, an evaporator fan 28 can be provided to enhance airflow. The evaporator fan, or pump if a water chiller system may be controlled by a controller.

Typically, a refrigeration system 10 will include a controller 30 which receives input information from a plurality of sensors such as a condenser temperature sensor 32, a liquid line sensor 34, a suction line sensor 36 and an evaporator temperature sensor 38. The system controller 30 also receives input from sensors 40 which provide a plurality of inputs relating to compressor motor current or phase balance for each compressor $C_1$ through $C_n$. The controller 30 also includes a plurality of outputs such as compressor motor control outputs 42 which allow the controller 30 to turn on or off any of compressors C1 through Cn. Other controller outputs include condenser fan outputs 44 allowing each condenser fan 18 to be turned on or off, as well as an expansion valve control output 46 allowing the expansion valve 22 to be opened or closed, and an evaporator fan control output 48 allowing an evaporator fan 28 to be turned on or off if the evaporator fan 28 is included in the system 10.

Figure 2:
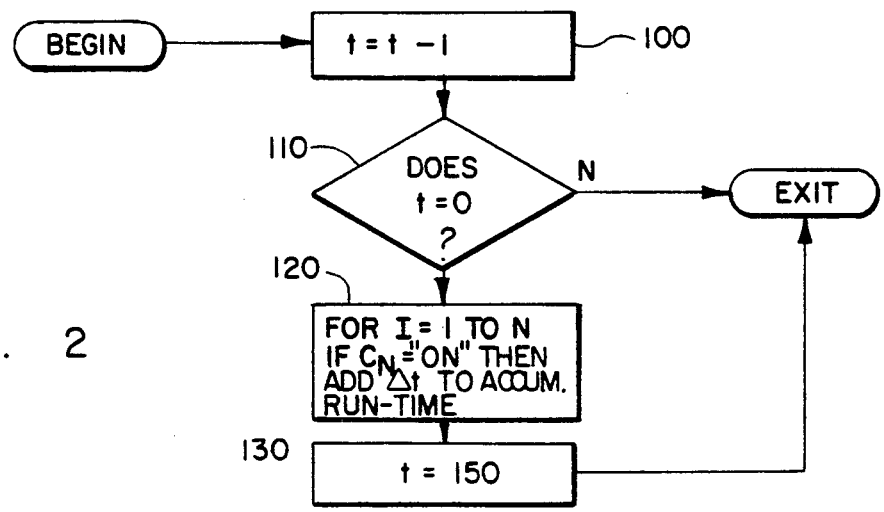
FIG. 2 is a flow chart indicating how compressor run time is accumulated.
Figures 3, 4:
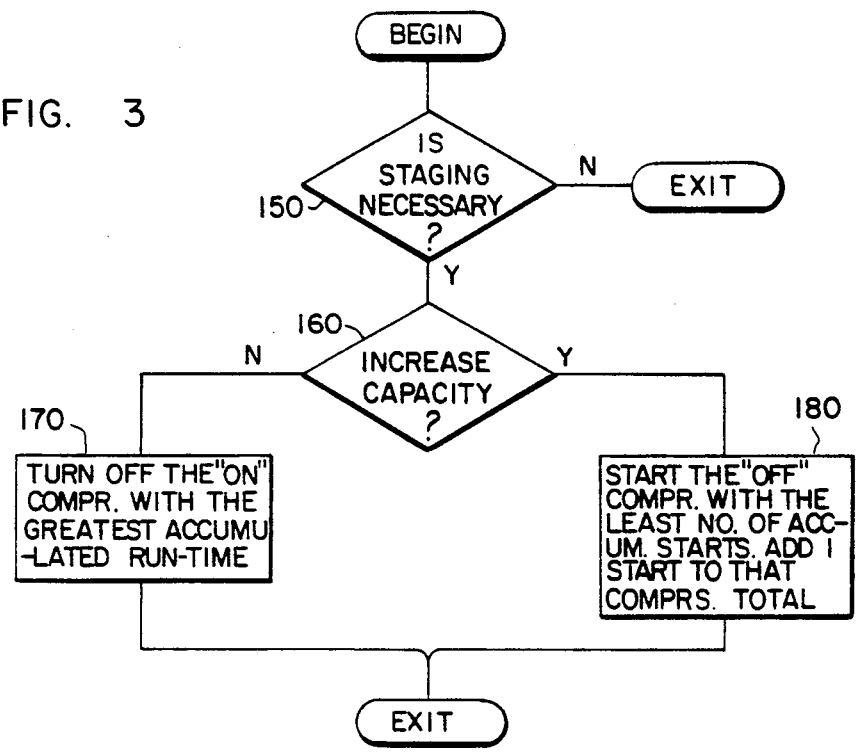
FIG. 3 is a flow chart indicating how the compressor staging decisions are made in accordance with the present invention.
FIG. 4 is a representation of the database information which is accumulated for each compressor in accordance with the present invention.

The controller 30 includes a microprocessor 50 such as a NEC series 78C10 microprocessor which includes both ROM and RAM memory. The microprocessor 50 includes hardware interrupts for implementing periodic timing routines such as the timing routine shown in FIG. 2. This particular timing routine is entered every 400 milliseconds by means of a hardware interrupt. One out of every 150 times that the timing routine is entered, the controller 30 determines, at step 120, which of compressor $C_1$ through $C_n$ are "on" and accumulates a run time of approximately one minute (150 interrupts times 400 milliseconds/interrupt) for each "on" compressor $C_1$ through $C_n$. The microprocessor 50 is able to monitor motor current draw or motor phase by means of the input lines 40 for each compressor $C_1$ through $C_n$ to determine if each of compressors C1 through Cn is on. The microprocessor 50 maintains a data file, such as shown in FIG. 4, for each compressor $C_1$ through $C_n$ and is able to accumulate run time for each compressor $C_1$ through $C_n$ by adding the change in time since the last periodic interrupt to an accumulated run time and storing the accumulated run time in a run time data location 60. Additionally, compressor status is stored in a further data location 62 as is accumulated starts in an accumulated starts data location 64. In this embodiment each compressor $C_1$ through $C_n$ presently in an "on" state has a change in time of one minute added to its accumulated run time because that time period reflects both the rate of hardware and the counting routine used. Of course, the timing of the periodic interrupt routine shown in FIG. 2 can be varied by any known amount of time in accordance with either system hardware interrupts or software timing routines. As an alternative to a periodic interrupt routine such as shown in FIG. 2, the microprocessor 50 could maintain compressor start times for each compressor and add the difference between the start time and the stop time when the compressor is stopped to the accumulated run time location as shown in FIG. 4.

FIG. 3 is a flow chart showing the staging decisions of the present invention. Initially at step 150, a determination is made using conventional methods to determine if staging is necessary. For example, an algorithm might be utilized which examines relative system pressure and compares relative system pressure to a setpoint. If the differential is higher than the setpoint by a specified amount, a compressor might be turned on. If the relative system pressure is lower than the setpoint by a specified amount, a compressor might be turned off. Many algorithms exist for determining if staging is necessary but relatively few algorithms address the question of which particular compressor to stage on or off.

Once the system determines that staging is necessary, the system of the present invention then determines at step 160 whether the change is an increase or a decrease in system capacity. If an increase in system capacity is necessary, the microprocessor 50 at step 180 examines the data location 64 of the data structure as shown in FIG. 4 which accumulates a first operative condition such as the number of times each compressor $C_1$ through $C_n$ is started, and determines the compressor $C_1$ through $C_n$ with the least number of starts. That particular compressor is turned on and one start is added to that particular compressors accumulated total. On the other hand, should a reduction in system capacity be necessary, the microprocessor 50 at step 170 examines a second operative condition such as the accumulated run times in data location 60 for each compressor $C_1$ through $C_n$ as saved in its data file per FIG. 4, and turns off the compressor $C_1$ through $C_n$ with the greatest accumulated run time. Where two or more compressors are found with the same accumulated totals, any tie breaking algorithm can be used.

Thus the present invention has been described in terms of a method for solving the problem of equalizing compressor wear in a multi-compressor system. The number of actual starts and cumulative run time is accumulated for each compressor. Compressor wear is equalized by using the accumulated compressor starts to determine which compressors to turn on (least starts, first on) and by using the accumulated compressor run time to determine which compressor to turn off (greatest cumulative run time, first off).

Although the present invention is described in connection with the preferred embodiment above, it is apparent that many alterations and modifications are possible without departing from the concept of the present invention. For example, the operative condition being accumulated could be modified from accumulated run-time to continuous run-time or to another variable indicative of compressor motor current draw or phase unbalance. It is intended that all such alterations and modifications be considered within the scope and spirit of the invention as claimed in the following claims.

What is claimed and desired to be secured by Letters Patent of the United States is:

1. A method of staging a plurality of compressors in a refrigeration system comprising the steps of:
   accumulating a first operative condition for each compressor;
   accumulating a second operative condition for each compressor where the second operative condition is distinct from the first operative condition;
   initiating operation of whichever compressor has the lowest accumulation of the first operative condition whenever a system controller calls for an increase in system capacity; and
   terminating operation of whichever compressor has the greatest accumulation of the second operative condition whenever the system controller calls for a reduction in system capacity.

2. The method of claim 1 wherein the first operative condition is the number of compressor starts and the second operative condition is the compressor run time.

3. The method of claim 1 wherein the first operative condition is compressor run time, and the second operative condition is compressor starts.

4. A method of staging a plurality of compressors in a refrigeration system comprising the steps of:
   accumulating the number of starts for each compressor;
   accumulating the run time for each compressor;
   initiating operation of whichever compressor has the lowest accumulation of starts whenever a system controller calls for an increase in system capacity; and terminating operation of whichever compressor has the greatest accumulation of run time whenever the system controller calls for a reduction in system capacity.

5. A refrigeration system comprising:

a plurality of compressors; and a system controller operatively connected to each of said plurality of compressors, said controller including:

means for accumulating a first operative condition for each compressor;

means for accumulating a second operative condition for each compressor where the second operative condition is distinct from the first operative condition;

means for initiating operation of whichever compressor has the lowest accumulation of the first operative condition whenever the system controller calls for an increase in system capacity; and means for terminating operation of whichever compressor has the greatest accumulation of the second operative condition whenever the system controller calls for a reduction in system capacity.

6. The system of claim 5 wherein the first operative condition is the number of compressor starts and the second operative condition is the compressor run time.

* * * * *